Oct. 9, 1962 C. E. MICHAEL 3,057,110
FISHING SINKER
Filed April 5, 1960

INVENTOR.
CHARLES E. MICHAEL
BY
Townsend and Townsend
ATTORNEYS

United States Patent Office 3,057,110
Patented Oct. 9, 1962

3,057,110
FISHING SINKER
Charles E. Michael, 2411 San Miguel Drive,
Walnut Creek, Calif.
Filed Apr. 5, 1960, Ser. No. 20,088
2 Claims. (Cl. 43—44.97)

This invention relates to a sinker for a fishing line.

One of the principal objects of this invention is to provide a novel sinker for fishing lines which will, to a great extent, avoid the problem of snagging which is characteristic of conventional sinkers.

A feature and advantage of this invention is that the sinker comprises a doughnut shaped weighted member linked to a smaller ring which is connected by a swivel joint to the fishing line in such a way that the weighted member is enabled to roll in virtually any axis so as to free itself from snagging engagement with obstacles.

The conventional sinker generally comprises a weighted member which is pivotally mounted on the end or at an intermediate portion of the line adjacent the end in such a way that the sinker is likely to snag itself between rocks, twigs or other debris. The conventional sinker is furthermore only rotatable about one axis and is pyramidal in shape so that once wedged between various debris or other objects, such as rocks or twigs, it causes a locking or jamming which results in the loss of the major part of the tackle.

The principal embodiment forms a circular weighted member which is linked to another member in such a way that there is completely free rotatable action allowed for the weighted member. This structure has been found to demonstrate a remarkable ability to free itself from obstacles which could exist on the water body floor. As it can be seen the entire body is capable of rotating in virtually any axis and thus will allow the body to rotate to free itself from snagging engagement.

A further object of this invention is to provide a novel sinker which will ride under the surface of a sandy bottom floor. This object is accomplished by forming the sinker in the form of a doughnut shaped weighted member with a smaller interconnecting ring of relatively large diameter linked to the weighted member and pivotally mounted to the line. By virtue of this structure the ring is pulled horizontally along the sandy bottom in such a way that the ring has a tendency to dig itself into the sandy bottom so as to be substantially concealed from view and to form additional drag which is beneficial in trolling operations in that the drag keeps the line substantially taut during the pulling of the line.

A still further object of this invention is to provide a novel sinker which is inexpensive to manufacture, easy to install and simple in operation.

Other objects of the present invention will become apparent upon reading the following specification and referring to the accompanying drawings in which similar characters of reference represent corresponding parts in each of the several views.

Figure 1:
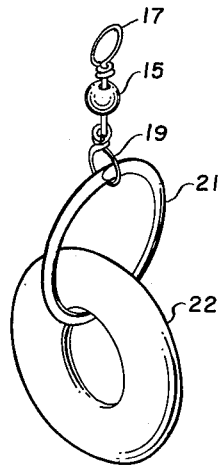
FIG. 1 is a perspective view of a principal embodiment of the invention.

Referring now to the drawings the principal embodiment of the invention comprises a swivel connector 15 of the type having connector members 17 and 19 mounted on each end of the connector. Connector 17 is connected to the leader 18 of a fishing line which can carry the hooks, spinners or other fishing gear as required. Such accessory gear is conventional and is not shown in the drawings.

Connector 19 is linked to a ring 21 which is of substantially large diameter and formed of relatively narrow cross-section.

A weighted annular sinker 22 is linked with ring 21. Weighted member 22 is formed of a heavy material such as lead and has a substantially large diameter either equal to or larger than the diameter of connecting ring 21. The diameter of the two rings 21 and 22 should be such as to provide a substantially large circular area in the center part of each of the rings which is many times larger than the cross-sectional diameter of sinker 22. This structure allows the ring not only to be relatively rotatable with respect to each other, but also allows for transverse movement of each ring relative to the other so that the rings are enabled to form a substantially pivoting action with respect to each other.

Weighted member 22 is formed predominantly of metallic material having a specific gravity substantially greater than water.

Weighted sinker 22 may be formed of a solid body of lead or iron or may be formed with a plastic coating having a filler of material which is substantially heavier than water.

In operation sinker 22, ring 21 and connector 19 are linked with the opposite connector 17 being connected to leader 18 of a fishing line. Selected fishing tackle is then attached to the leader and used in the conventional manner.

Figure 3:
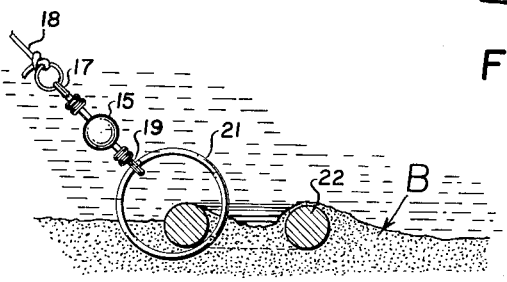
FIG. 3 is a side elevational view showing the sinker in cross-section and impeded under the surface of a sandy water bottom.

The device is then lowered into the water and pulled. When the sinker engages the bottom of the water there is a tendency of the sinker to accept one of two positions relative to the bottom floor. For example, as seen in FIG. 3, the sinker might ride in a horizontal axis relative to the floor. If the bottom, as indicated at B, of the water body floor is of sandy texture, it has been found that the sinker will have a tendency to dig into the sand as it is being drawn in the horizontal plane thus causing the sinker to add greater resistance to being pulled and consequently causing the effect of straightening the line and leader.

The device also remains substantially hidden from view due to the fact that the greater body of the floor is below the surface of the sand. This can be an asset in certain fishing situations where it is desirable to keep the sinker out of view of the game fish.

Figure 2:
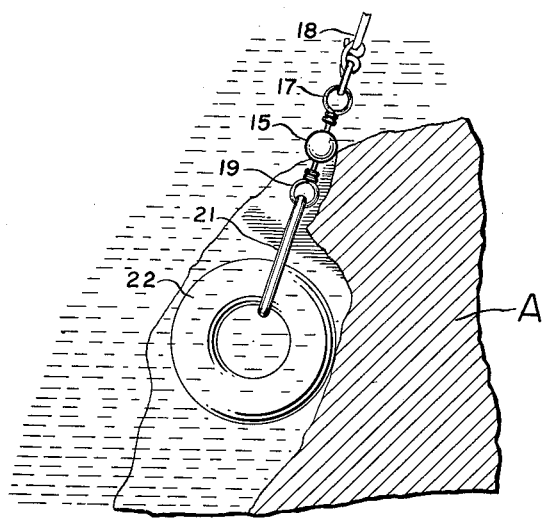
FIG. 2 is a side elevational view of the device shown in operation and in engagement with a substantially vertical underwater impediment.

Then the sinker engages a vertical member, such as seen at A in FIG. 2, it can be seen that the edge of sinker 22 engages the vertical wall of member A in a rolling or wheeling type engagement pivoted about the axis formed by the body of the interconnected linked ring 21. This not only allows for free rotation but also allows for the rotation of sinker 22 about a yieldable axis which comprises ring 21.

Should the device be snagged between two closely associated imbedded members under the water body floor, it will be noted that the sinker is capable of rotation relative to ring 21 along a transverse as well as a rotating axis. In addition the entire unit including ring 21 and sinker 22 is rotatably supported on swivel connector 15. Thus the device is capable of being moved in substantially any direction. In that the leading surface of the larger body, that is sinker member 22, is formed in a circular configuration, it can be seen that the leading edge of the body will rest upon a surface which will tend to wedge or cam itself out of frictionally locking engagement with imbedded members on the floor. Thus the improved sinker of this invention is not only capable of rolling over the surface of the floor, and imbedding itself under the surface of a sandy floor but is also capable of camming itself out of locking engagement with imbedded objects.

Although the foregoing invention has been described in some detail by way of illustration and example for purposes of clarity of understanding, it is understood that certain changes and modifications may be practiced within the spirit of the invention as limited only by the scope of the appended claims.

What is claimed:

1. A sinker for connection to the end of a fishing line comprising a swivel connector connected to the end of the line having a loop of substantially small diameter mounted on the end of said connector, a connector ring linked to said loop, said connector ring being circular in cross-section and having an inside diameter many times larger than said loop, and a weighted annular sinker formed in circular cross-section linked to said ring, said sinker having an inside diameter at least equal to the inside diameter of said ring and having a cross-sectional dimension substantially smaller than the inside diameter of said ring, said sinker being formed predominantly of metallic material having a specific gravity substantially greater than water.

2. A sinker combination for connection to the end of a fishing line comprising a heavily weighted ring of substantially large diameter, swivel means connected to the end of said line and having a ring of relatively small diameter connected to the end of said swivel means, and an inter-linking ring of relatively large diameter linking the small diameter ring and the weighted ring, said weighted ring and said inter-linking ring being freely rotatable relative to each other equally well in all relative positions.

References Cited in the file of this patent
UNITED STATES PATENTS

| | | |
|---|---|---|
| 1,412,011 | Bohm | Apr. 4, 1922 |
| 2,516,036 | Whitlow et al. | July 18, 1950 |
| 2,768,468 | Kibler et al. | Oct. 30, 1956 |
| 2,813,367 | Jackson | Nov. 19, 1957 |
| 2,930,159 | Culhane | Mar. 29, 1960 |
| 2,945,324 | Miller | July 19, 1960 |
| 2,958,976 | Adams | Nov. 8, 1960 |